(12) United States Patent
Thomson et al.

(10) Patent No.: US 8,099,107 B2
(45) Date of Patent: Jan. 17, 2012

(54) METHOD AND APPARATUS FOR WLAN LOCATION SERVICES

(75) Inventors: Allan Thomson, Pleasanton, CA (US); David Sheldon Stephenson, San Jose, CA (US); James Martin Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 11/409,422

(22) Filed: Apr. 21, 2006

(65) Prior Publication Data
US 2007/0249366 A1     Oct. 25, 2007

(51) Int. Cl.
*H04W 24/00* (2009.01)
(52) U.S. Cl. .................. 455/456.3; 455/414.1; 370/328; 370/338; 370/254; 370/260
(58) Field of Classification Search .................. 370/338, 370/254, 352, 260, 328, 331, 339; 455/414.1, 455/456, 456.3, 456.1, 456.2; 705/50, 65
See application file for complete search history.

(56) References Cited

U.S. PATENT DOCUMENTS

| | | | |
|---|---|---|---|
| 6,556,832 B1 * | 4/2003 | Soliman ..................... | 455/456.5 |
| 2001/0009544 A1 * | 7/2001 | Vanttinen et al. ............. | 370/338 |
| 2004/0186851 A1 * | 9/2004 | Jhingan et al. .............. | 707/104.1 |
| 2005/0078644 A1 * | 4/2005 | Tsai et al. ..................... | 370/338 |
| 2005/0102180 A1 * | 5/2005 | Gailey et al. .................... | 705/14 |
| 2006/0126536 A1 * | 6/2006 | Patel et al. .................... | 370/254 |
| 2006/0209866 A1 | 9/2006 | Steenkiste et al. ............ | 370/419 |
| 2007/0093258 A1 * | 4/2007 | Steenstra et al. ........... | 455/456.5 |

OTHER PUBLICATIONS

Dan Simone, 802.11k makes WLANS measure up, Network World, Mar. 29, 2004, www.networkworld.com/news/tech/2004/0329techupdate.html.
Muthukrishnan, et al., WLAN Location Sharing Through a Privacy Observant Architecture, University of Twente, Computer Architecture Design and Test for Embedded systems Group (Oct. 2005).
PCT Notification of Transmittal of the International Search Report and the Written Opinion of the International Searching Authority, or the Declaration mailed Sep. 12, 2008, re PCT/US07/66491 filed Apr. 12, 2007 (11 pages).

* cited by examiner

*Primary Examiner* — Dwayne Bost
*Assistant Examiner* — Inder Mehra
(74) *Attorney, Agent, or Firm* — Baker Botts L.L.P.

(57) ABSTRACT

Methods, apparatuses and systems directed to providing location services in a wireless network. According to one implementation of the present invention, the wireless network infrastructure provides high-accuracy location information via location services to wireless clients. In one embodiment, during an advertisement phase, a location server provides a list of available location services to wireless clients via a central controller. In another embodiment, during a presentation phase, a driver of the wireless client presents the available location services to one or more applications of the wireless client. In another embodiment, during a request phase, the driver transmits a location service request to the central controller, which passes the location service request to the location server.

18 Claims, 10 Drawing Sheets

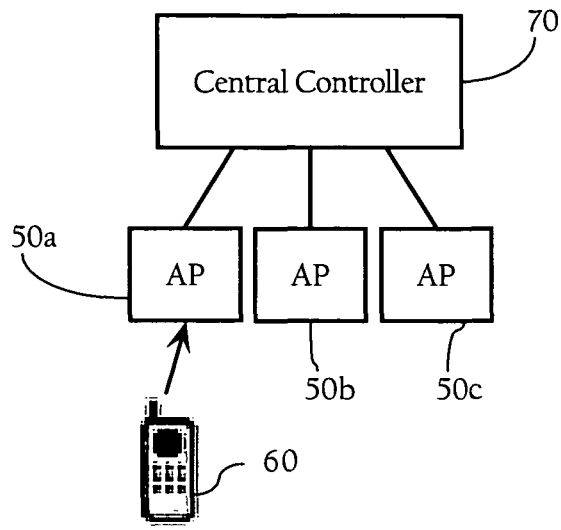
Fig._1B
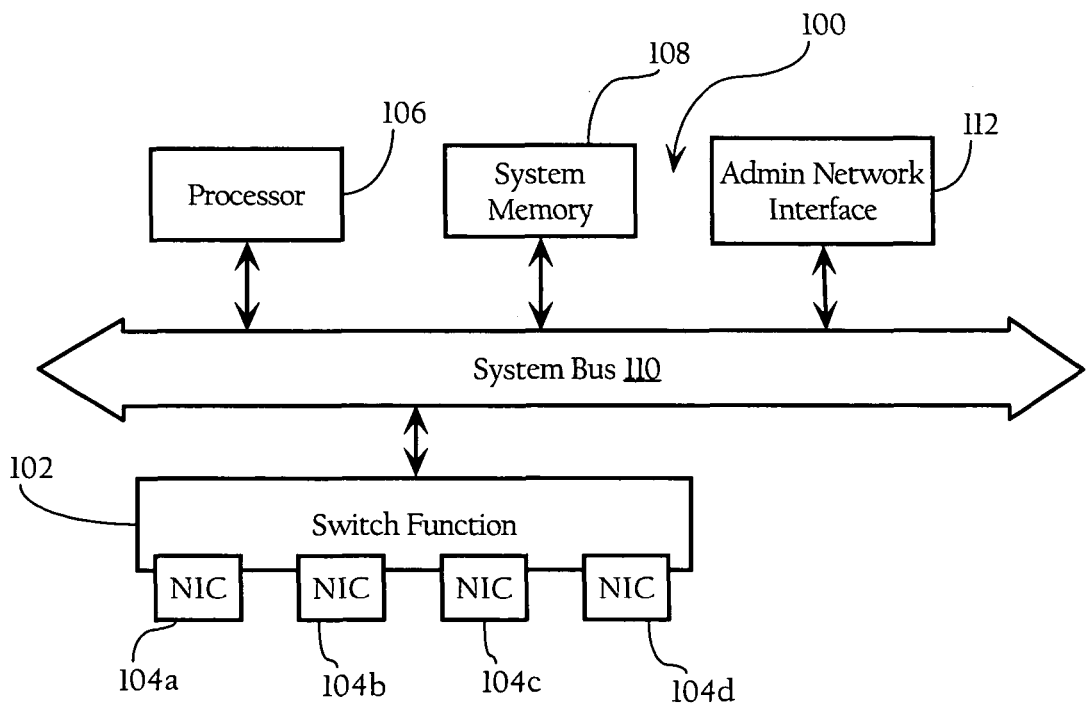
Fig._1C

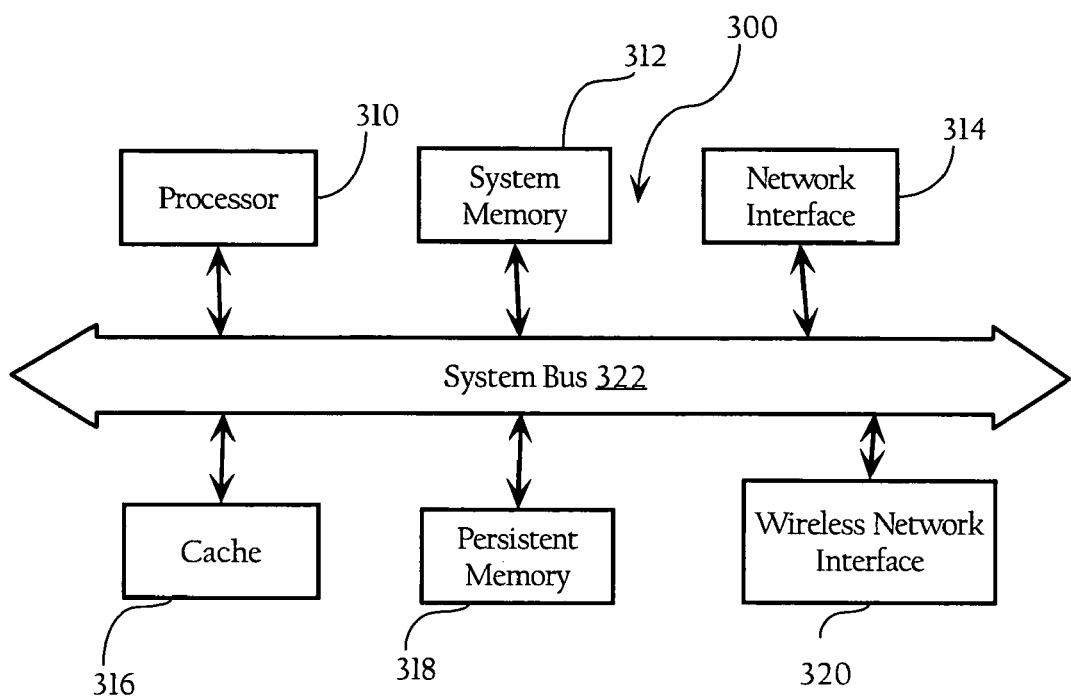
Fig._2

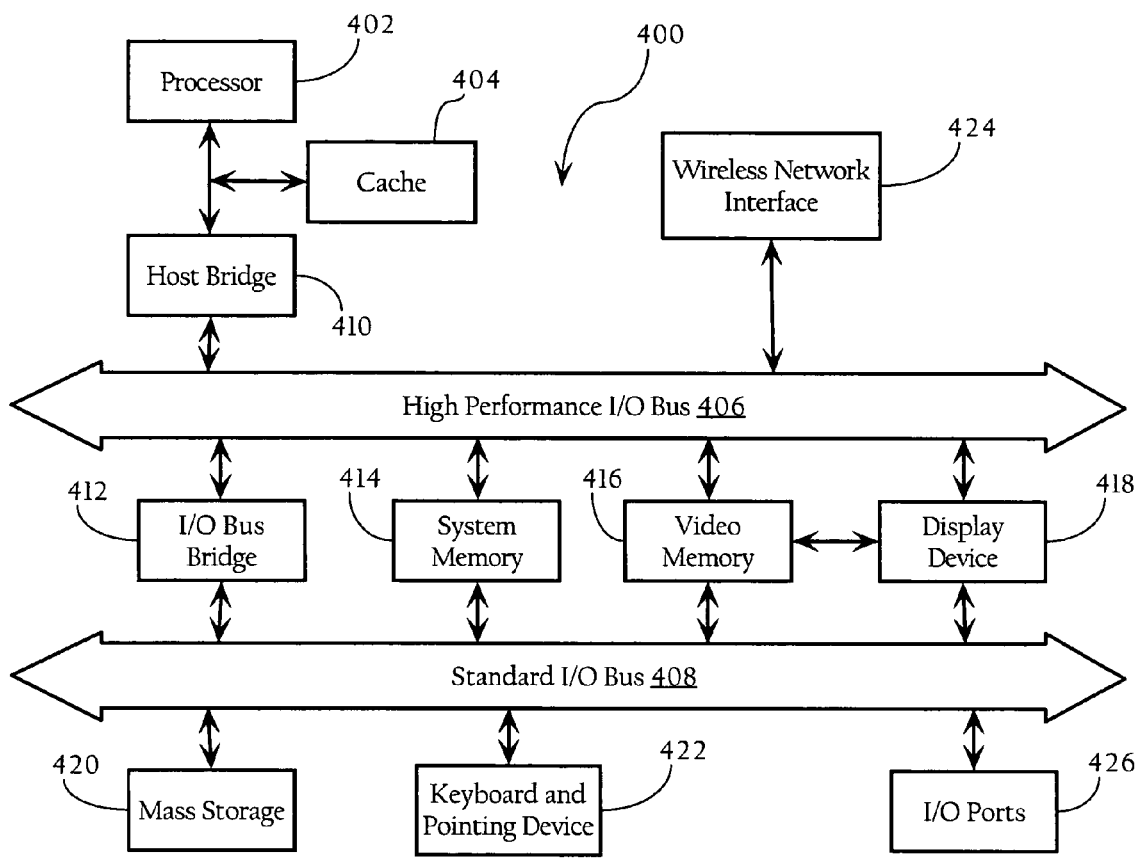
Fig._3

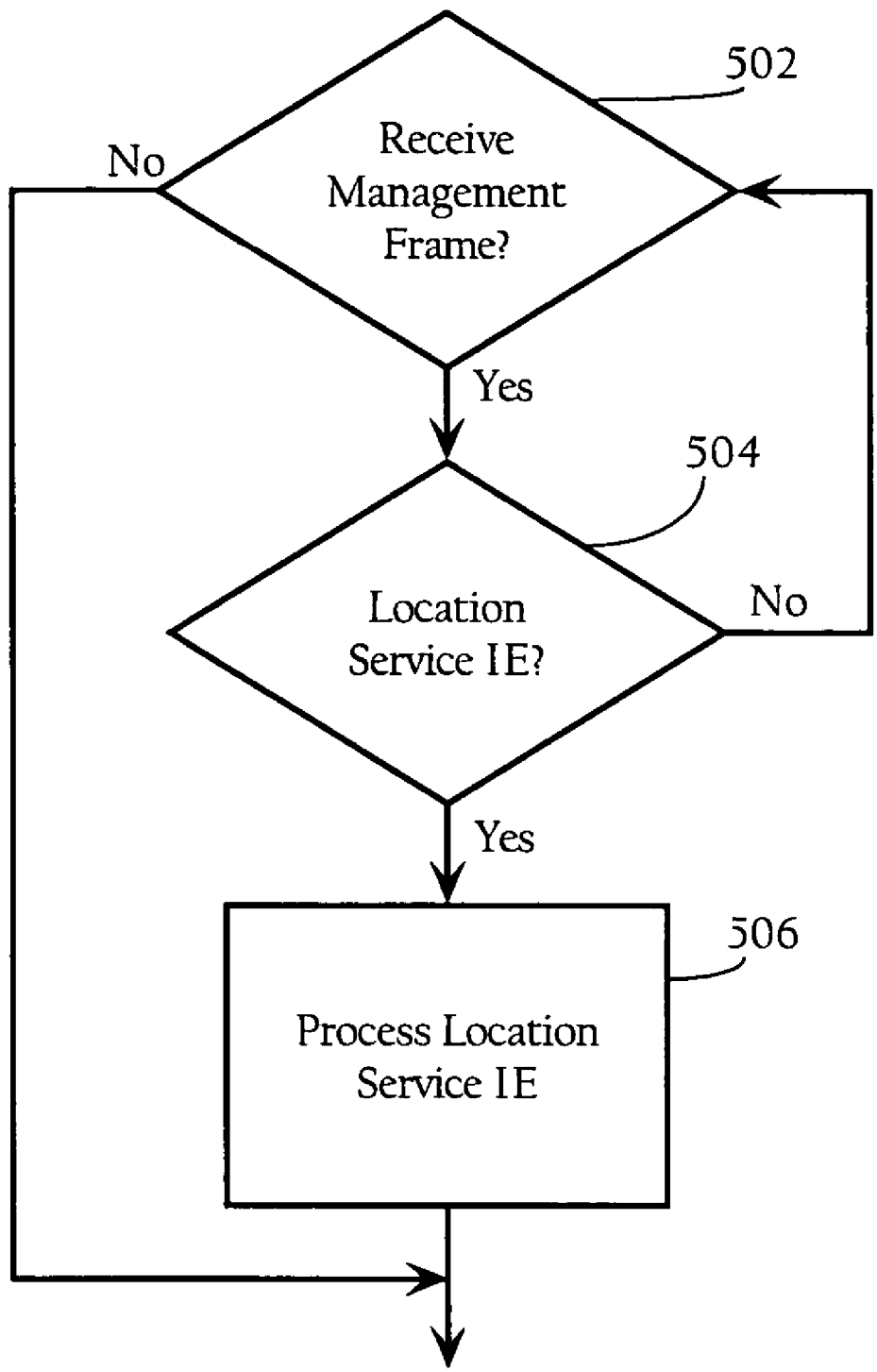
Fig._6

| | Element ID | Length | Cisco Aironet OUI | Type/Version | Service Field | Option Field |
|---|---|---|---|---|---|---|
| Octets: | 1 | 1 | 3 | 1 | 2 | 2 |

Fig._7

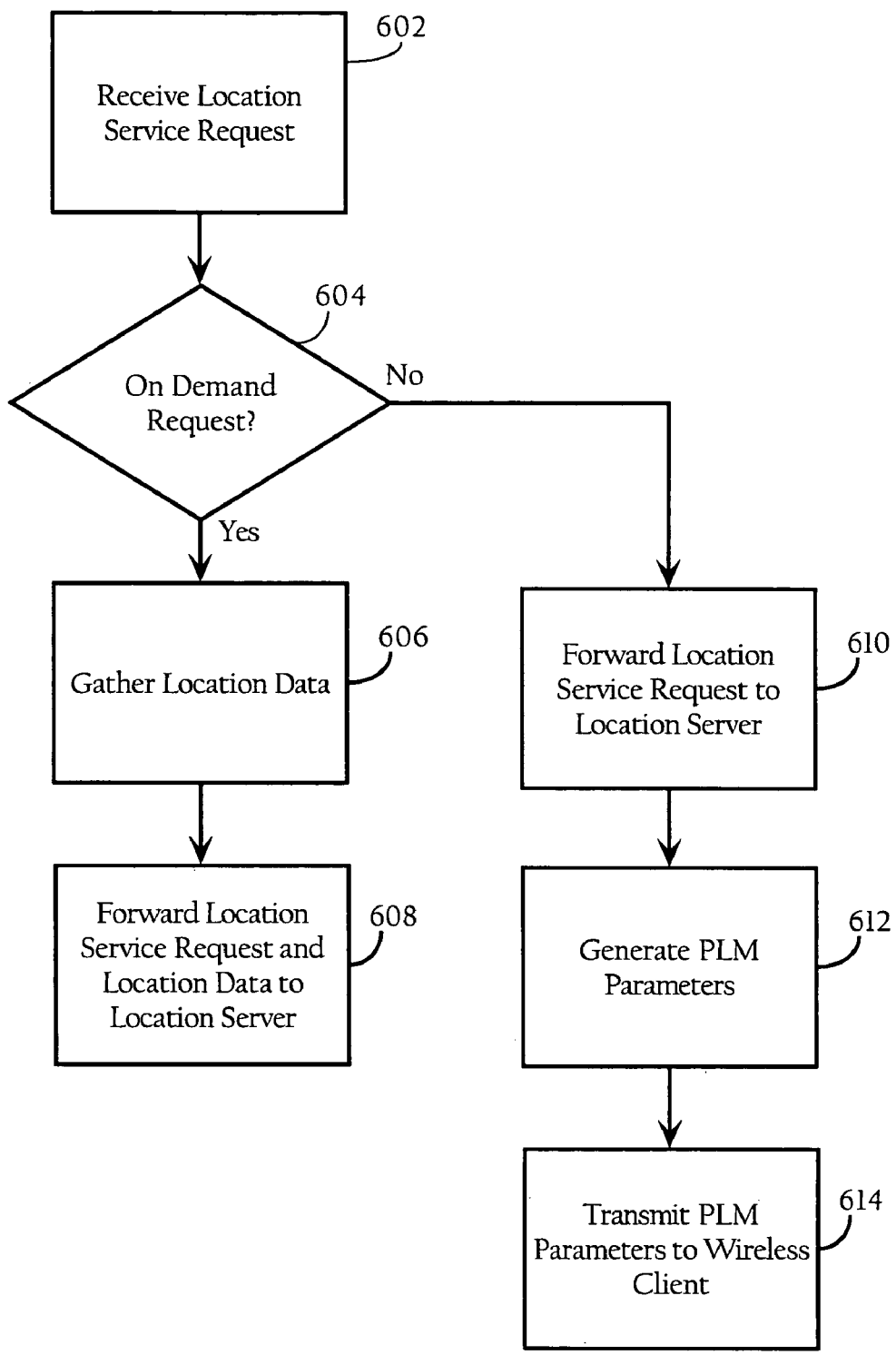
Fig._8

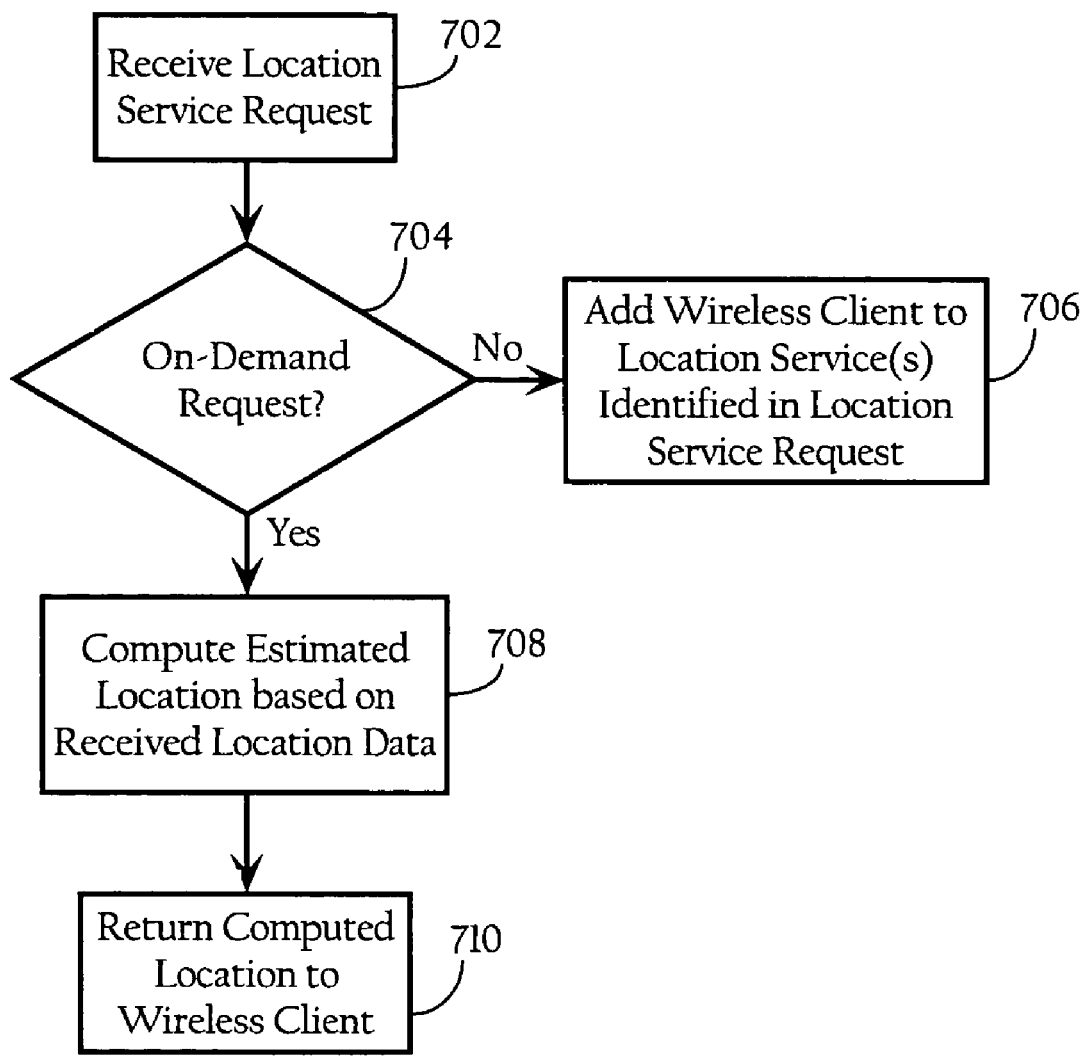
Fig._9

US 8,099,107 B2

METHOD AND APPARATUS FOR WLAN LOCATION SERVICES

FIELD OF THE INVENTION

The present invention relates to wireless networks and, more particularly, to methods, apparatuses, and systems directed to providing location services in a wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management and performance from their network.

For some applications, it is desirable to provide location information to the wireless clients. Some wireless infrastructures may provide the MAC address of a wireless access point or a basic service set identification (BSSID), as a coarse-grained proxy for the actual location, to the client during an initial association between the wireless access point and the wireless client. However, such systems do not provide location information about the wireless client. The IEEE 802.11k standard defines a mechanism for a wireless client to request its location from the wireless infrastructure. This location is generally defined in location configuration information (LCI) (e.g., latitude/longitude). The IEEE 802.11k standard does not support, however, location based services that support more than one location service type.

DESCRIPTION OF THE DRAWINGS

FIG. 1B illustrates a hierarchical wireless network including a central controller, according to one implementation of the present invention.

FIG. 1C illustrates for didactic purposes a hardware system, which may be used to implement a central controller.

FIG. 2 illustrates for didactic purposes a hardware system, which may be used to implement a wireless access point.

FIG. 3 illustrates for didactic purposes a hardware system, which may be used to implement a wireless client.

FIG. 6 is a flow chart illustrating a process flow, according to one implementation of the present invention, implemented at a wireless client.

FIG. 7 is a data structure of an exemplary location service IE according to one implementation.

FIG. 8 is a flow chart illustrating a process flow, according to one implementation of the present invention, implemented at a central controller.

FIG. 9 is a flow chart illustrating a process flow, according to one implementation of the present invention, implemented at a location server.

DESCRIPTION OF EXEMPLARY EMBODIMENTS

A. Overview

The present invention provides methods, apparatuses, and systems directed to providing location services in a wireless network. According to one implementation of the present invention, the wireless network infrastructure provides high-accuracy location information via location services to wireless clients, which may include any wireless device capable of receiving the location information (e.g., laptops, personal digital assistants (PDAs), radio frequency identification (RFID) tags, etc.). For example, a location service may provide location information that describes where a particular wireless client is located in a particular region (e.g., one square meter in accuracy) within a particular city, campus, or building. As described in more detail below, in one implementation, location services may be categorized into location service classes. In one implementation, one location service class may include on-demand location services, and another location service class may include update location services. In one implementation, for each location service class, the location server may provide to a wireless client a comprehensive set of location service options. For example, for update location services, update options may include receiving update services based on one or more triggers, which may be based on events including time intervals, movement, containment, etc.

In one implementation, during an advertisement phase, a location server provides a list of its available supported location services to wireless clients via one or more elements of the wireless network infrastructure. The location server provides to the wireless network infrastructure a list of available location services that the location server supports. The wireless network infrastructure may then advertise the available location services to wireless clients. In one implementation, during a presentation phase, a wireless network interface driver of the wireless client presents the available location services to one or more applications of the wireless client. During a request phase, the wireless client transmits a location service request to the wireless network infrastructure, which passes the location service request to the location server. The location service request, in one implementation, may be a request to subscribe to an update location service or an on-demand request for one or more location services.

B. Exemplary Wireless Network System Architecture

B.1. Network Topology

Figure 1A:
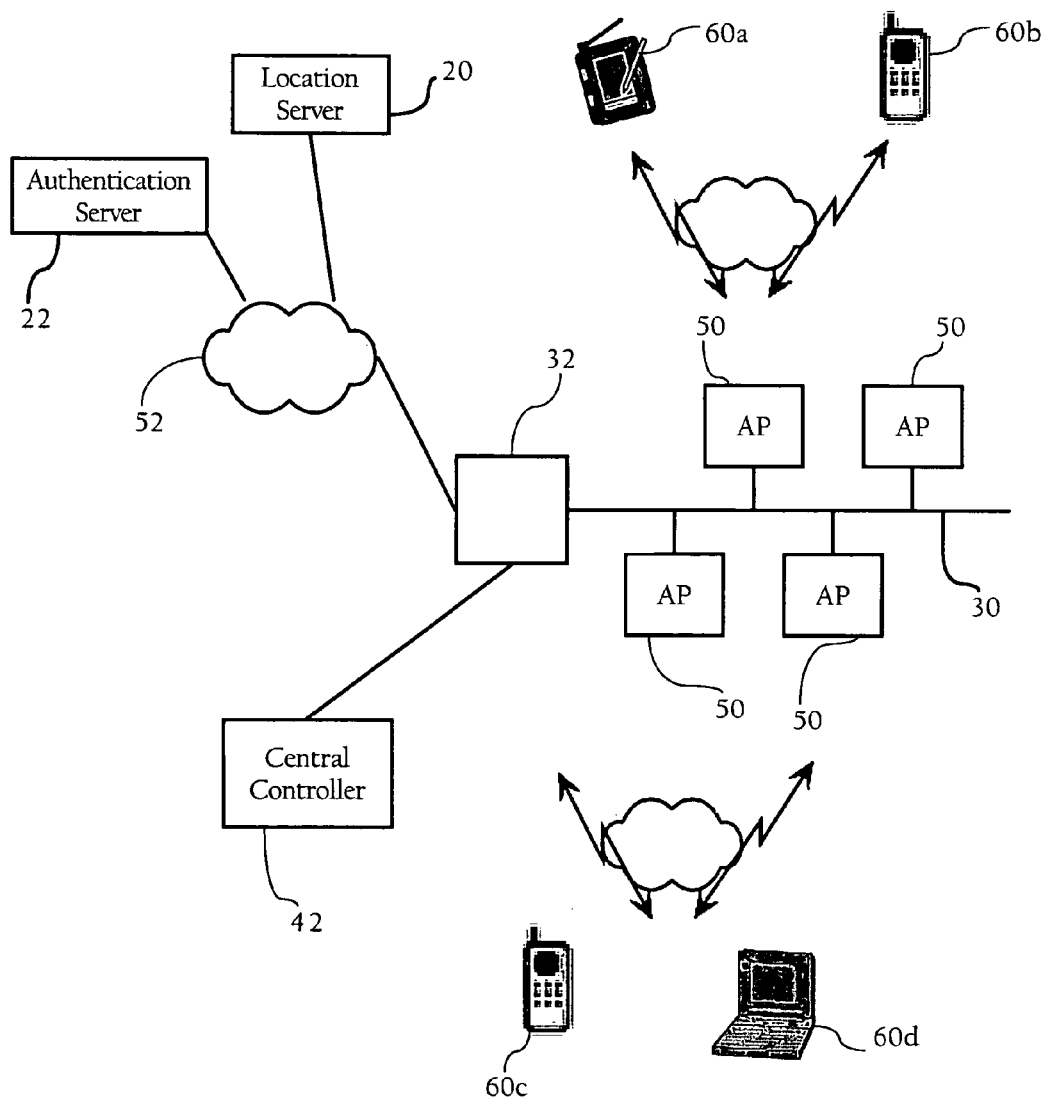
FIG. 1A is a topological diagram of the components in a wireless local area network (WLAN) system according to one implementation of the present invention.

A network environment including a wireless local area network (WLAN) according to one implementation of the present invention is shown in FIG. 1A. In a specific embodiment of the present invention, the system includes a location server 20, an Authentication Authorization and Account (AAA) server 22, and a central controller 42, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge. The location server supports a variety of location service categories and options, described below.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between location server 20, AAA server 22, central controller 42, and wireless clients via wireless access points 50. Of course, network 52 can include a variety of network segments, transmission technologies and components, such as terrestrial WAN links, satellite links, optical fiber links, and cellular links; network 52 could also be a campus LAN. LAN 30 may be a LAN or LAN segments implemented by an Ethernet switch (not shown) or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates a hierarchical wireless network including a central controller 70, which may be used to implement a central controller 42 of FIG. 1B. In one implementation, central controller 70 may be used to advertise available location services wireless clients and to receive location service requests from wireless clients according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with light-weight wireless access points and process wireless protocol and network management information.

FIG. 1C illustrates for didactic purposes a hardware system 100, which may be used to implement a central controller 70 of FIG. 1B. As FIG. 1C shows, in one implementation, the central control elements each comprise a switch function or fabric 102 comprising a network interface 104a (e.g., a Ethernet adapter) for connection to network 52 and corresponding network interfaces 104b, 104c, and 104d for connection to the access elements, a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller includes a single network interface.

B.3. Wireless Access Point

FIG. 2 illustrates for didactic purposes a hardware system 300, which may be used to implement a wireless access point 50 of FIG. 1. In one implementation, the wireless access point 300 comprises a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc.) and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.4. Wireless Client

FIG. 3 illustrates for didactic purposes a hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by. a processor in a hardware system, such as processor 402. Initially, the series of instructions are stored on a storage device, such as mass storage 420. However, the series of instructions can be stored on any. suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 3 illustrates, for didactic purposes, the hardware architecture of a wireless-client according to one implementation of the present invention, the wireless client, however, may be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Location Services

As described above, the wireless network infrastructure provides location information via location services to wireless clients. The location server 20, in one implementation, supports a plurality of location services, such as on-demand location services and update location services, where update location services may include automatic location updates, conditional location updates, and the like. An on-demand location service, for example, may provide location information that describes where a particular wireless client is located in a particular region (e.g., within one square meter in accuracy) within in a particular city, campus, or building. An update (i.e., subscription) location service may also provide location information (e.g., where a particular wireless client is located in a particular city, campus, or building), but the delivery of the location information may be based on one or more triggers, which may include the occurrence of one or more events including time interval triggers, movement, containment, etc. For example, the update location service may provide the wireless client with a location update periodically (e.g., every 60 minutes). In one implementation, the update location service may provide the wireless client with a location update based on particular conditions. For example, in one implementation, a condition may be a change in location (e.g., when the wireless client enters or leaves a particular area). Also, parameters may define the conditions. For example, in one implementation, the particular area may be defined as a particular room, floor, building, etc. The sections below describe location service classes and location service options in more detail.

C.1. Location Service Classes

As discussed above, location server 20 supports a plurality of location service classes, each corresponding to a type of location service. Location service classes may include on-demand location services and/or subscription-based services. A location service class is a mode by which the wireless client receives a location service. For example, in one implementation, a wireless client may access a location service by transmitting an on-demand request or by subscribing to a location update service. In one implementation, an on-demand request is a one time request for the estimated location of the wireless client. For example, after transmitting a first on-demand request, the wireless client may need to transmit additional on-demand requests for each desired location update. In one implementation, an update service will provide location updates periodically or upon the occurrence of certain events. In one implementation, the location server 20 provides options for both on-demand location services and update location services. The location services supported by location server 20, in one implementation, are independent of each other. Accordingly, a wireless client may simultaneously request, or subscribe to, more than one location service supported by location server 20.

C.2. Location Service Options

In some implementations, for one or more of the location service classes (e.g., on-demand location services or update location services), location server 20 provides to the wireless client a set of location service options. For example, in one implementation, for update location services, location service options may include receiving updates based on one or more triggers, which may include the occurrence of one or more events including time interval triggers, movement, containment, etc. For example, in one implementation, an update may be triggered based on a signal automatically triggered by a clock according to various schedules, periodically (e.g., every minute, every hour, etc.) or at particular times (e.g., 12:00 p.m., 2:50 p.m., etc.). In one implementation, updates may be conditioned upon a threshold distance traveled (e.g., every 5 meters), movement from a reference point, crossing a threshold region, movement in or out of an area, floor, or building, etc., and the like. Update choices may include location updates based on other network parameters such as traffic generated by wireless clients, transmission control protocol (TCP) connections either from or to the client (i.e., as the wireless client accesses a web site with a specific URL, give an update of location), etc.

For both on-demand and update location services, the location server 20 provides various options such as format (e.g., geospatial, CIVIC, and/or proprietary formats), resolution (e.g., location accuracy), and message encoding options (e.g., binary vs. text-based encoding), and the like. For example, in one implementation, a format option may enable a selection of formats that the wireless network infrastructure supports as either part of an on-demand request or an update location service request. For example, in one implementation, format options may include a geospatial format (i.e., geographic coordinates), a civic format (i.e., postal or legal addresses), an LCI format, or a proprietary format. In one implementation, a resolution option defines the accuracy to which the wireless network infrastructure attempts to calculate a location. For example, the resolution option may include a building resolution where the wireless infrastructure may resolve a location to a particular building within a campus (or a room within a building) that a wireless client resides. Further, the resolution option may include a wireless access point resolution, where the wireless network infrastructure may resolve a location to a particular wireless access point to which a wireless client is connected. Further, the resolution option may include an XY resolution, where the wireless network infrastructure may resolve a location to a specific XYZ point within the coordinate space. In one implementation, the datum used for XY Resolution is relative to the location format chosen. In one implementation, an encoding option may include text (e.g., extensible markup language (XML)) or binary options (e.g., binary representation of XML). In one implementation, a security option may include a requirement that location information be digitally signed for secure distribution.

In one implementation, location server 20 may give a high priority to emergency requests. For example, an e911 location server 20 may provide location information to a wireless client so that the wireless client can include the location information as part of emergency call signaling.

D. Overview of Message Flows for Location Services

D.1. On-Demand Location Services

Figure 4:
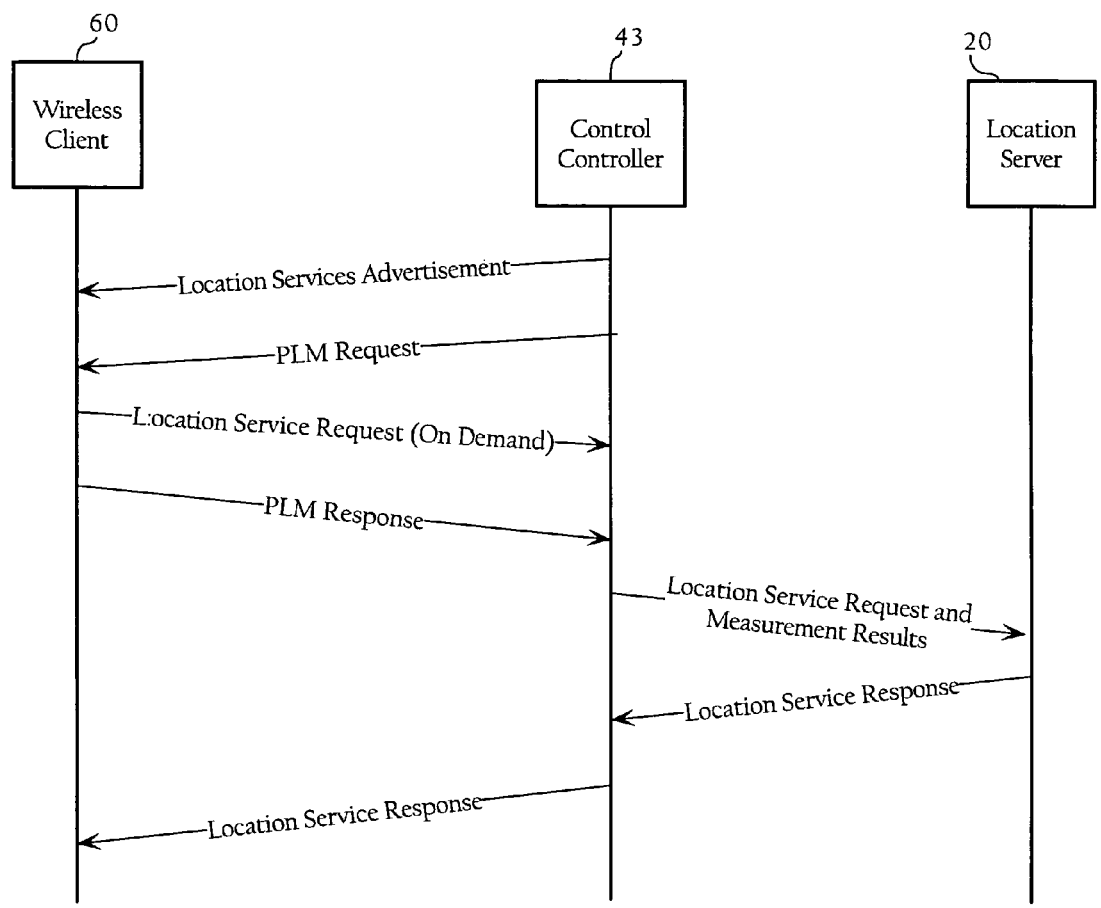
FIG. 4 is a diagram illustrating a possible message flow in accordance with one implementation of the present invention.

FIG. 4 is a diagram illustrating a possible message flow among a wireless client 60, a central controller 43, and a location server 20 in accordance with one implementation of the present invention. FIG. 4 illustrates one implementation where central controller 43 transmits a location services advertisement, which indicates location services that location server 20 supports. Central controller 43 also transmits path loss measurement (PLM) parameter request (PLM request). As described in more detail below, PLM parameters are parameters according to which a wireless client transmits wireless frames that are detected by one or more access points (or other wireless receivers associated with the wireless network infrastructure). Upon receiving the location services advertisement and PLM request, wireless client 60 transmits a location service request (i.e., an on-demand location service request) and a PLM response, which includes measurements results, to central controller 43, which forwards the location service request and measurement results to location server 20. Location server 20 then transmits a location service response to central controller 43, which then forwards the location service response to wireless client 60. The location services advertisement, PLM request and response, location service request and response are described in more detail below.

D.2. Update Location Services

Figure 5:
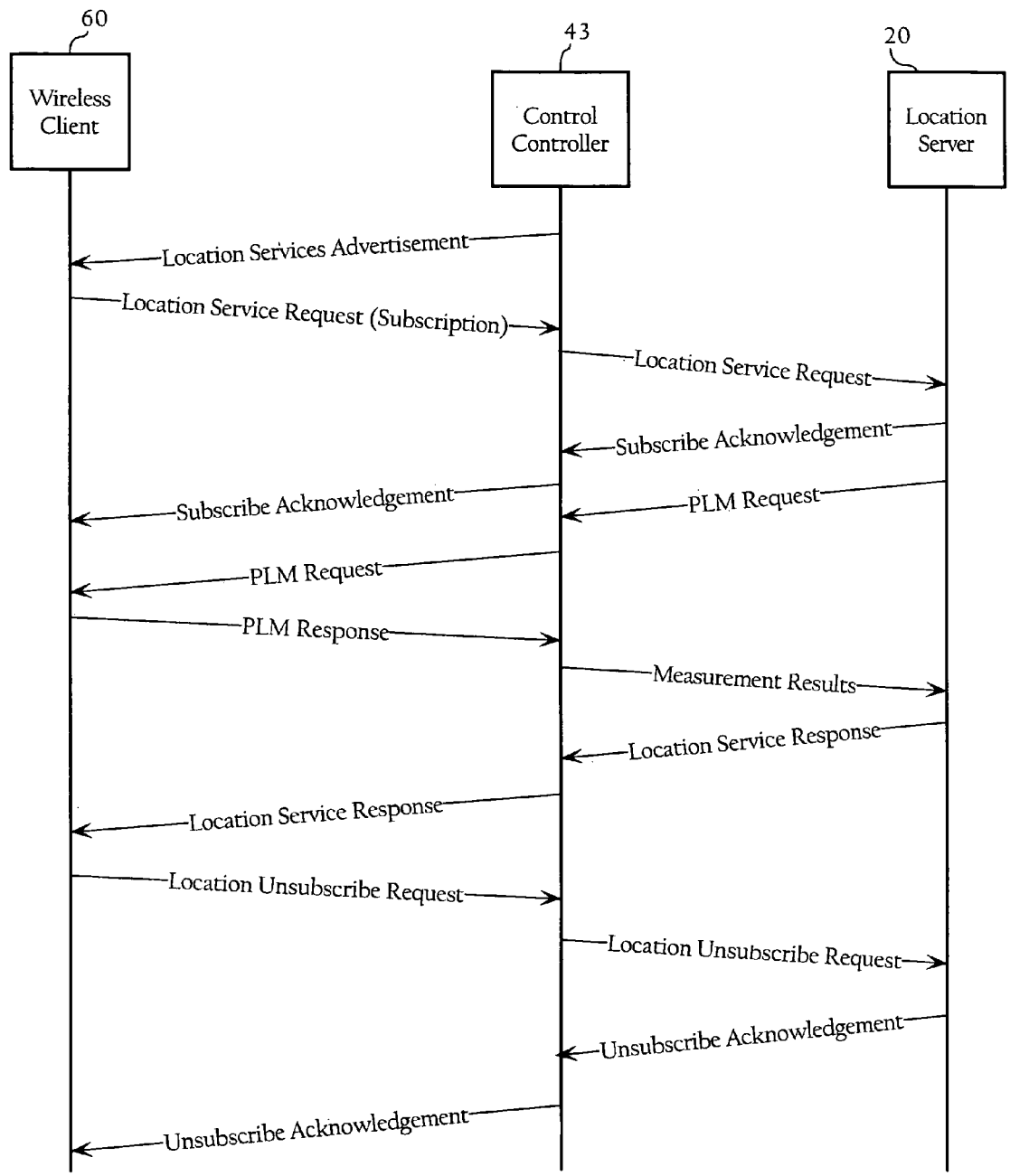
FIG. 5 is a diagram illustrating a possible message flow in accordance with one implementation of the present invention.

FIG. 5 is a diagram illustrating a possible message flow among a wireless client 60, a central controller 43, and a location server 20 in accordance with one implementation of the present invention. FIG. 5 illustrates one implementation where central controller 43 transmits a location services advertisement to wireless client 60. Upon receiving the location services advertisement, wireless client 60 transmits a location service request (i.e., an update location service request) to central controller 43, which forwards the location service request to location server 20. In one implementation, location server 20 transmits a subscribe acknowledgement and a PLM request to central controller 43, which forwards the subscribe acknowledgement and PLM request to wireless client 60. Wireless client 60 then transmits a PLM response to central controller 43, which transmits measurements results to location server 20. Location server 20 transmits a location service response to central controller 43, which forwards the location service response to wireless client 60. In one implementation, wireless client 60 may transmit a location unsubscribe request to central controller 43, which then forwards the unsubscribe request to location server 20. The unsubscribe request terminates the update location service subscription. Location server 20 then transmits an unsubscribe acknowledgement to central controller 43, which forwards the unsubscribe acknowledgement to wireless client 60.

E. Location Services Advertisement, Presentation, and Requests

The following sections describe how a wireless network infrastructure advertises one or more location services to a wireless client and how the wireless client requests or subscribes to one or more location services.

E.1. Advertisement of Location Services

As described above, in one implementation, location server 20 provides a list of its available supported location services to wireless clients 60 via the wireless network infrastructure. More specifically, location server 20 provides to central controller 70 a list of available location services, and central controller 70 advertises the available location services to wireless clients 60 via wireless access points 50. In one implementation, during a presentation phase, the wireless client receives the advertisements and then presents the available location services to one or more applications of the wireless client. The wireless network infrastructure advertises the one or more location services supported by location server 20 in a variety of manners. For example, in one implementation, the wireless network infrastructure may advertise the location service types and attributes in a location service Information Element (location service IE) appended to wireless network management frames, such as Beacon Frames, Probe Response Frames, Authentication Response Frames, and Association Response Frames. A location service IE is an element that indicates what location services are available and, in some implementations, the attributes of the available location services. The location service IE is described in more detail below in connection with FIGS. 6 and 7. In one implementation, the information IE may be advertised in other frame types, such as a management frame specifically dedicated to location service advertisements.

E.2. Presentation of Location Services

FIG. 6 is a flow chart illustrating a process flow, according to one implementation of the present invention, implemented at the wireless client 60. In a presentation phase, a wireless network interface driver of the wireless client 60 (e.g., an 802.11 MAC driver) determines if it has received a management frame (502). In one implementation, wireless client 60 may receive management frames during various processes, such as while scanning the RF environment for access points, and/or during an association or authentication process. If wireless client 60 receives such a management frame, wireless client 60 then determines if the management frame includes a location service IE, if any (504).

FIG. 7 is a data structure of an exemplary location service IE according to one implementation. In one implementation, the location service IE includes an element identification (element ID) field, a length field, an organization unique identifier. (OUI) field, a service field, and an option field. In one implementation, the element ID identifies the wireless client and the TSID identifies an emergency message. In one implementation, the TSID field may contain the same value as that in the corresponding TSPEC request (or TCLAS element if present). As described in more detail below, in one implementation, the bandwidth use field contains a value that may identify a type or "use" of call (e.g., whether the call is emergency-related). In one implementation, the location service IE includes various information such as an element ID field, a services field, and an option field. In one implementation, the element ID field describes an IEEE 802.11 assigned value for vendor-specific information elements. In one implementation, the services field describes the location service classes that the wireless network infrastructure supports. In one implementation, the option field describes location service attributes and options corresponding to the location service classes that the wireless network infrastructure supports.

In one implementation, the position of each bit in the services field corresponds to a location service class (e.g., on-demand location service or update location service), and the value of each bit indicates whether location services in the particular location service class is available (e.g., 0=available; 1=not available). Similarly, in one implementation, the position of each bit in the option field corresponds to a location service option (e.g., geospatial, CIVIC, proprietary format, building resolution, wireless access point resolution, x-y coordinate resolution, binary encoding text-based encoding, etc.), and the value of each bit indicates whether the particular location option is available (e.g., 0=available; 1=not available). In one implementation, if a bit is unused, the bit may be reserved for additional classes, options, etc.

If the management frame includes a location service IE, the wireless network interface driver processes the location service IE (506). In one implementation, the wireless network interface driver parses the information in the location service IE and populates a data structure, such as a location services table, with information from the location service IE. In one implementation, the wireless network interface driver updates the location service data structure as subsequent location services advertisements are received. One or more applications installed on the wireless client may then access the location service data structure to determine available location services and attributes. In one implementation, the wireless network interface driver further supports application programming interfaces (APIs) that allow the one or more applications to make calls to the driver to request that a location service request frame be transmitted. The calls can include parameters, such as the selected location service and one or more options corresponding to the selected location service. For example, in a subscription phase, an application may select one or more of the location services, such as a location update service, and invoke the wireless network interface driver to transmit a location service request identifying the location update service.

E.3. Request for Location Services

FIG. 8 is a flow chart illustrating a process flow, according to one implementation of the present invention, implemented by the wireless network infrastructure (in one implementation, at the central controller 70). In one implementation, during a request phase, the driver of the wireless client 60 transmits a location service request to the central controller 70, which the wireless network infrastructure forwards to the location server 20. Central controller 70 monitors and receives a location service request from wireless client 60 (602). In one implementation, the location service request may identify one or more location services. In one implementation, central controller 70 may validate wireless client 60. For example, central controller 70 may determine whether wireless client 60 is blacklisted. In one implementation, for denied subscriptions, the infrastructure will provide an error/fault code in response to the wireless client. Central controller 70 then determines if the location service request is an on-demand request (604). If the location service request is an on demand request, central controller 70, in one implementation, gathers location data, such as signal strength information, to be used to compute the estimated location of the wireless client (606). In one implementation, central controller 70 requests location data from the wireless client. For example, the location data may include the signal strength observed by the wireless client of transmissions by one or more access points 50 of the wireless network infrastructure. In another implementation, the location data may include signal information obtained by one or more access points 50 of the wireless network infrastructure. In some implementations, the central controller 70 (or some other element of the wireless network infrastructure) may direct the wireless client to transmit a series of frames on one or more selected operating channels to allow one or more access points 50 of the wireless network infrastructure to detect the signal of the wireless client. In one implementation, the location data may include measurement information such as received signal strength information or other location measurement information (e.g., Time of Arrival (TOA) or Time Difference of Arrival (TDOA) information). Central controller 70 then forwards the location service request and collected location data to the location server (608).

If the location service request is not an on-demand request (604), central controller 70 forwards the location service request to location server 20 (610). Central controller 70 then generates path loss measurement (PLM) parameters (612). The PLM parameters are parameters according to which the wireless client transmits wireless frames that are detected by one or more access points 50 (or other wireless receivers associated with the wireless network infrastructure). As above, one or more detected attributes of the RF signals corresponding to the frames are forwarded to location server 20. In one implementation, the central controller 70 transmits the PLM parameters to the wireless client (612). In one implementation, the transmission of the PLM parameters may correspond to one or more attributes of a wireless frame transmission schedule where the wireless client transmits a plurality of wireless frames. In one implementation, the wireless frame transmission schedule may include one or more of the following PLM parameters: 1) an interval between bursts of wireless frames, 2) the number of wireless frames in a burst, 3) the RF channels on which to transmit the wireless frames, and 4) an overall duration (expressed, for example, as a total number of bursts or as a period of time). In one implementation, the PLM parameters may specify that the wireless client gather and transmit wireless frames to particular wireless access points operating on respective RF channels (e.g., channels 1, 6, and 11) at particular time periods (e.g., every minute). After central controller 70 collects the location data, it then forwards the location data to location server 20. Location server 20 may then provide location services to wireless client 60. The location data enables location server 20 to provide location updates as often as the location data is updated.

In one implementation, the PLM parameters may vary depending on the location services and/or attributes selected by the wireless client. For example, a first update location service may require shorter intervals between bursts, while a second update location service may require a greater number of wireless frames in each burst. Accordingly, central controller 70, in one implementation, is configured to parse the location service request and identify one or more suitable PLM parameters to provide to the wireless client based on the one or more selected location services and/or options.

In one implementation, for security and privacy reasons, central controller 70 may provide a given wireless client only the location information of that wireless client. In another implementation, a given wireless client may request location information for other entities in the network and may receive such location information if authorized.

FIG. 9 is a flow chart illustrating a process flow, according to one implementation of the present invention, implemented at a location server. As shown in FIG. 9, location server 20 receives the location service request (702) and determines whether the location service request is an on-demand request (704). If the not, location server 20 adds the wireless client to the location service(s) identified in the location service request (706). If the location service request is an on-demand request, location server 20 computes the estimated location based on received location data (i.e., measurement results from a PLM response) (708). Location server 20 then returns the computed location to the wireless client.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic for requesting one or more location services provided by a network infrastructure, the logic encoded in one or more non-transitory computer readable media for execution and when executed operable to:
   access, at a wireless client station, one or more wireless advertisements transmitted by a wireless access point, wherein the one or more wireless advertisements identify one or more location services which an application hosted on the wireless client station can access to receive a location of the wireless client station;
   populate a data structure maintained at the wireless client station and accessible to one or more applications hosted on the wireless client station with information relating to the one or more location services;
   present one or more application programming interfaces to the one or more applications hosted on the wireless client station to allow for selection of one or more of the one or more location services; and
   transmit, responsive to selection of one or more of the identified location services by a first application of the one or more applications, a location service request identifying one or more of the selected location services, wherein the one or more wireless advertisements are wireless local area network (WLAN) management frames, and wherein the one or more location services are contained in information elements appended to the WLAN management frames.

2. The logic of claim 1 wherein at least one location service comprises an on-demand location service.

3. The logic of claim 1 wherein at least one location service comprises an update location service.

4. The logic of claim 1 wherein the one or more wireless advertisements further comprise one or more location service options comprising one or more of a format option, resolution option, and an encoding option.

5. The logic of claim 1 wherein the WLAN management frames are one or more of any of the following WLAN management frames including Beacon Frames, Probe Response Frames, Authentication Response Frames, and Association Response Frames.

6. In a wireless client, a method comprising:
   accessing, at a wireless client station, one or more wireless advertisements transmitted by a wireless access point, wherein the one or more wireless advertisements identify one or more location services which an application hosted on the wireless client station can access to receive a location of the wireless client station;
   populating a data structure maintained at the wireless client station and accessible to one or more applications hosted on the wireless client station with information relating to the one or more location services;
   presenting one or more application programming interfaces to the one or more applications hosted on the wireless client station to allow for selection of one or more of the one or more location services; and
   transmitting, responsive to selection of one or more of the identified location services by a first application of the one or more applications, a location service request identifying one or more of the selected location services, wherein the one or more wireless advertisements are wireless local area network (WLAN) management frames, and wherein the one or more location services are contained in information elements appended to the WLAN management frames.

7. The method of claim 6 wherein at least one location service comprises an on-demand location service.

8. The method of claim 6 wherein at least one location service comprises an update location service.

9. The method of claim 6 wherein the one or more wireless advertisements further comprise one or more location service options comprising one or more of a format option, resolution option, and an encoding option.

10. The method of claim 6 wherein the WLAN management frames are one or more of any of the following WLAN management frames including Beacon Frames, Probe Response Frames, Authentication Response Frames, and Association Response Frames.

11. A wireless client comprising:
   a wireless network interface;
   a memory;
   a processor; and
   a data storage medium comprising computer-readable instructions operable, when executed to cause the processor and the wireless network interface to:
      access one or more wireless advertisements transmitted by a wireless access point, wherein the one or more wireless advertisements identify one or more location services which an application hosted on the wireless client can access to receive a location of the wireless client station;
      populate a data structure maintained in the memory and accessible to one or more applications hosted on the wireless client with information relating to the one or more location services;
      present one or more application programming interfaces to the one or more applications hosted on the wireless client to allow for selection of one or more of the one or more location services; and
      transmit, responsive to selection of one or more of the identified location services by a first application of the one or more applications, a location service request identifying one or more of the selected location services,
   wherein the one or more wireless advertisements are wireless local area network (WLAN) management frames, and wherein the one or more location services are contained in information elements appended to the WLAN management frames.

12. Logic for providing one or more location services provided by a network infrastructure, the logic encoded in one or more non-transitory computer readable media for execution and when executed operable to:

transmit, to a wireless client station, wireless frames advertising one or more location services which an application hosted on the wireless client station can access to receive a location of the wireless client station, wherein the wireless frames are wireless local area network (WLAN) management frames, and wherein the one or more location services are contained in information elements appended to the WLAN management frames;

forward location service requests received from wireless clients to a location server; and generate path loss measurement parameters (PLM) including a radio transmission schedule including one or more of an interval between bursts, a number of bursts, and one or more radio channels on which to transmit.

13. The logic of claim 12 wherein the logic is operable to collect location data for a wireless client if a received location service request is an on-demand request.

14. The logic of claim 12 wherein the WLAN management frames are one or more of any of the following WLAN management frames including Beacon Frames, Probe Response Frames, Authentication Response Frames, and Association Response Frames.

15. In a wireless network infrastructure node, a method comprising:

transmitting, to a wireless client station, wireless frames advertising one or more location services which an application hosted on the wireless client station can access to receive a location of the wireless client station, wherein the wireless frames are wireless local area network (WLAN) management frames, and wherein the one or more location services are contained in information elements appended to the link-layer wireless network management frames;

forwarding location service requests received from wireless clients to a location server; and generating path loss measurement parameters (PLM) including a radio transmission schedule including one or more of an interval between bursts, a number of bursts, and one or more radio channels on which to transmit.

16. The method of claim 15 further comprising:

collecting location data for a wireless client if a received location service request is an on-demand request.

17. The method of claim 15 wherein the WLAN management frames are one or more of any of the following WLAN management frames including Beacon Frames, Probe Response Frames, Authentication Response Frames, and Association Response Frames.

18. An apparatus comprising:

means for transmitting wireless frames advertising one or more location services, wherein the wireless frames are link-layer wireless network management frames, and wherein the one or more location services are contained in information elements appended to the wireless local area network (WLAN) management frames;

means for forwarding location service requests received from wireless clients to a location server; and means for generating path loss measurement parameters (PLM) including a radio transmission schedule including one or more of an interval between bursts, a number of bursts, and one or more radio channels on which to transmit.

* * * * *